(12) United States Patent
Chimanchode et al.

(10) Patent No.: US 11,567,941 B1
(45) Date of Patent: Jan. 31, 2023

(54) JOIN ELIMINATION ENHANCEMENT FOR REAL WORLD TEMPORAL APPLICATIONS

(71) Applicant: Teradata US, Inc, San Diego, CA (US)

(72) Inventors: Jaiprakash G Chimanchode, Hyderabad (IN); Bhashyam Ramesh, Secunderabad (IN); Stephen A Brobst, Las Vegas, NV (US); Pratik Patodi, Raipur (IN); Dhrubajyoti Roy, Kolkata (IN); Sai Pavan Kumar Pakala, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 175 days.

(21) Appl. No.: 17/078,997

(22) Filed: Oct. 23, 2020

Related U.S. Application Data

(60) Provisional application No. 62/953,966, filed on Dec. 27, 2019.

(51) Int. Cl.
| | | |
|---|---|---|
| *G06F 16/2455* | (2019.01) | |
| *G06F 16/2458* | (2019.01) | |
| *G06F 16/28* | (2019.01) | |
| *G06F 16/11* | (2019.01) | |
| *G06F 16/23* | (2019.01) | |
| *G06F 16/22* | (2019.01) | |

(52) U.S. Cl.
CPC ........ *G06F 16/2456* (2019.01); *G06F 16/128* (2019.01); *G06F 16/2282* (2019.01); *G06F 16/2322* (2019.01); *G06F 16/2477* (2019.01); *G06F 16/288* (2019.01)

(58) Field of Classification Search
CPC ............. G06F 16/2456; G06F 16/2282; G06F 16/2477; G06F 16/2322; G06F 16/288; G06F 16/128
USPC ......................................................... 707/714
See application file for complete search history.

(56) References Cited

U.S. PATENT DOCUMENTS

| | | | |
|---|---|---|---|
| 8,396,860 B1 * | 3/2013 | Ramesh | G06F 16/24537 707/759 |
| 8,666,956 B1 * | 3/2014 | Ramesh | G06F 16/2477 707/703 |
| 2004/0236746 A1 * | 11/2004 | Lomet | G06F 16/2477 707/999.009 |
| 2007/0130171 A1 * | 6/2007 | Hanckel | G06F 16/2477 |
| 2016/0125053 A1 * | 5/2016 | Willson | G06F 16/219 707/746 |
| 2020/0250188 A1 * | 8/2020 | McCracken | G06F 16/2322 |

\* cited by examiner

*Primary Examiner* — Robert W Beausoliel, Jr.
*Assistant Examiner* — Arthur Ganger
(74) *Attorney, Agent, or Firm* — Howard Speight

(57) ABSTRACT

A database system receives a query and determines that the query includes an inner join between a parent table and a child table. The database system determines that the following relationships exists between the parent table and the child table: referential integrity ("RI") between a primary key attribute (pk) in the parent table and a foreign key attribute (fk) in the child table and a temporal relationship constraint ("TRC") between a period attribute in the parent table and a TRC-attribute in the child table. The database system determines that the query satisfies non-temporal join elimination conditions and temporal join elimination conditions and that the query contains no other qualification conditions on the parent table's period attribute and eliminates the inner join when planning execution of the query.

20 Claims, 6 Drawing Sheets

Scenario 1 where JE can be extended:

Scenario 2A where JE can be extended:

Scenario 2B where JE can be extended:

Scenario 4A where JE can be extended:

JOIN ELIMINATION ENHANCEMENT FOR REAL WORLD TEMPORAL APPLICATIONS

CROSS-REFERENCE TO RELATED APPLICATIONS

This application claims the benefit of U.S. Provisional Patent Application 62/953,966, entitled "Join Elimination Enhancement for Real World Temporal Applications," filed on Dec. 27, 2019, which is incorporated by reference in its entirety.

BACKGROUND

A join elimination (JE) reduces the join degree, i.e., the number of tables accessed by a query, by eliminating tables from the query when it is safe to do so. Typically, JE is applied for inner joins (i.e., a join that includes no unmatched rows from either of the tables involved in the inner join) defined as primary key to foreign key joins, or primary key to primary key joins. In the case of a non-temporal relationship integrity (RI) constraint between a non-temporal child table having a foreign key (fk) and a non-temporal parent table having a primary key (pk), elimination of the parent table from the join in the query is possible if the query satisfies the following non-temporal JE conditions:
1. The query does not access any column other than the pk column(s) from the parent table.
2. The query specifies an equality predicate of the form pk=fk.
3. The pk column(s) (either explicitly or by definition) is unique.

JE for joins involving temporal tables is a challenge.

SUMMARY

Figure 1:
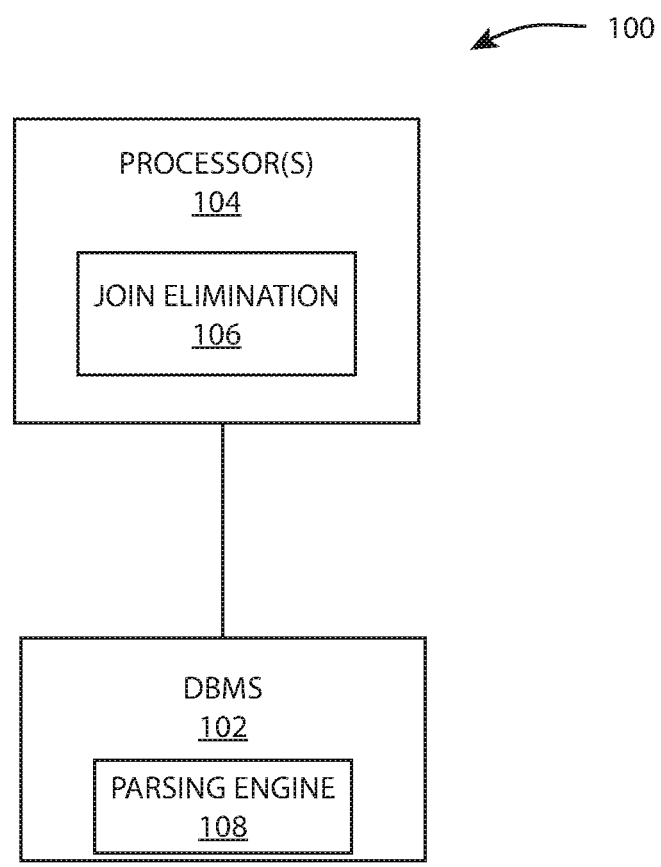
FIG. 1 is one example of a block diagram of a node of a database system.

In one aspect, a method includes a database system receiving a query. The database system determines that the query includes an inner join between a parent table and a child table. The database system determines that the following relationship exists between the parent table and the child table: referential integrity ("RI") between a primary key attribute (pk) in the parent table and a foreign key attribute (fk) in the child table. "Attribute" is defined to mean one or more columns. The database system determines that the following relationship exists between the parent table and the child table: a temporal relationship constraint ("TRC") between a period attribute in the parent table and a TRC-attribute in the child table. The TRC-attribute being a date or time attribute, wherein the TRC requires that: the period attribute in the parent table includes a TransactionTime column having TransactionTime values, the child table does not include a ValidTime column, the value of the TRC-attribute for a given row identifies a time at which the given row became valid, and wherein the given row is valid from the time specified in the TRC-attribute onward, and the value in the TRC-attribute for the given row exists within the value of the period attribute of a parent table row matched to the given row. The database system determines that the query satisfies non-temporal join elimination conditions. The database system determine that the query satisfies temporal join elimination conditions. The database system determines that the query contains no other qualification conditions on the parent table's period attribute. The database system eliminates the inner join when planning execution of the query. The database system executes the query against the child table without reference to the parent table to produce a result. The database system saves the result.

Implementations may include one or more of the following. Determining that the query satisfies temporal join elimination conditions may include determining that the query selects a snapshot from the parent table which is equal to or in the future with respect to a system time. Determining that the query satisfies temporal join elimination conditions may include determining that the query selects a snapshot from the parent table which is in the past with respect to system time and determining that the query selects a snapshot from the child table which is equal to or prior to the snapshot selected from the parent table. Determining that the query satisfies temporal join elimination conditions may include determining that the query selects a snapshot from the parent table which is in the past with respect to system time and determining that the query selects only rows from the child table for which the TRC-attribute is contained in the period attribute of the parent table. Determining that the query selects only rows from the child table for which the TRC-attribute is contained in the period attribute of the parent table may include determining that the query includes a predicate requiring the TRC-attribute to be less than or equal to the time of the snapshot from the parent table. Determining that the query satisfies temporal join elimination conditions may include determining that the query selects only rows from the parent table for which the TRC-attribute is contained in the period attribute of the parent table. Determining that the query selects only rows from the parent table for which the TRC-attribute is contained in the period attribute of the parent table may include determining that the query contains a WHERE clause of the form parent.TransactionTime CONTAINS child.TRCcolumn, where parent.TransactionTime is the period attribute in the parent table and child.TRCcolumn is the TRC-attribute in the child table. The parent table may be a bi-temporal table having a ValidTime column and a TransactionTime column and the TRC may include a TransactionTime_TRC between the TRC-attribute in the child table (child.TRC-attribute) and the TransactionTime column in the parent table (parent.TT), a ValidTime_TRC between the TRC-attribute in the child table and the ValidTime column in the parent table. The TRC may include a check constraint may be defined on the child table that requires for each row of the child table that the TRC be less than or equal to the TransactionTime. The TRC may include that the query selects a ValidTime snapshot from the parent table which is equal to or in the future with respect to a system time. The TRC may include that the query selects a snapshot in TransactionTime from the parent table that is a point-in-time selection or that the query includes a predicate of the form parent.TT CONTAINS child.TRC-attribute. The parent table may be a bi-temporal table having a ValidTime column and a TransactionTime column. The TRC may include a TransactionTime_TRC between the TRC-attribute in the child table (child.TRC-attribute) and the TransactionTime column in the parent table (parent.TT) and a ValidTime_ TRC between TRC-attribute in the child table and the ValidTime column in the parent table. The TRC may include a check constraint defined on the child table that requires for each row of the child table that the TRC be less than or equal to the TransactionTime. The TRC may include that the query selects a ValidTime snapshot from the parent table which is in the past with respect to system time. The TRC may include that the query selects a TransactionTime snapshot from the child table at a time less than or equal to the ValidTime snapshot from the parent table. The TRC may include that the query selects a snapshot in TransactionTime from the parent table that is a point-in-time selection or that the query includes a predicate of the form parent.TT CONTAINS child.TRC-attribute.

In one aspect non-transitory computer-readable tangible medium, on which is recorded a computer program, the computer program comprising executable instructions, that, when executed, perform a method. The method includes a database system determining that the query includes an inner join between a parent table and a child table. The database system determines that the following relationship exists between the parent table and the child table: referential integrity ("RI") between a primary key attribute (pk) in the parent table and a foreign key attribute (fk) in the child table. "Attribute" is defined to mean one or more columns. The database system determines that the following relationship exists between the parent table and the child table: a temporal relationship constraint ("TRC") between a period attribute in the parent table and a TRC-attribute in the child table, the TRC-attribute being a date or time attribute. The TRC requires that the period attribute in the parent table includes a TransactionTime column having TransactionTime values. The child table does not include a ValidTime column. The value of the TRC-attribute for a given row identifies a time at which the given row became valid. The given row is valid from the time specified in the TRC-attribute onward. The value in the TRC-attribute for the given row exists within the value of the period attribute of a parent table row matched to the given row. The method includes determining that the query satisfies non-temporal join elimination conditions. The method includes determining that the query satisfies temporal join elimination conditions. The method includes determining that the query contains no other qualification conditions on the parent table's period attribute. The method includes eliminating the inner join when planning execution of the query. The method includes executing the query against the child table without reference to the parent table to produce a result. The method includes saving the result.

Implementations may include one or more of the following. Determining that the query satisfies temporal join elimination conditions may include determining that the query selects a snapshot from the parent table which is equal to or in the future with respect to a system time. Determining that the query satisfies temporal join elimination conditions may include determining that the query selects a snapshot from the parent table which is in the past with respect to system time and determining that the query selects a snapshot from the child table which is equal to or prior to the snapshot selected from the parent table. Determining that the query satisfies temporal join elimination conditions may include determining that the query selects a snapshot from the parent table which is in the past with respect to system time and determining that the query selects only rows from the child table for which the TRC-attribute is contained in the period attribute of the parent table. Determining that the query selects only rows from the child table for which the TRC-attribute is contained in the period attribute of the parent table may include determining that the query includes a predicate requiring the TRC-attribute to be less than or equal to the time of the snapshot from the parent table. Determining that the query satisfies temporal join elimination conditions may include determining that the query selects only rows from the parent table for which the TRC-attribute is contained in the period attribute of the parent table. Determining that the query selects only rows from the parent table for which the TRC-attribute is contained in the period attribute of the parent table may include determining that the query contains a WHERE clause of the form parent.TransactionTime CONTAINS child.TRCcolumn, where parent.TransactionTime is the period attribute in the parent table and child.TRCcolumn is the TRC-attribute in the child table. The parent table may be a bi-temporal table having a ValidTime column and a TransactionTime column. The TRC may include a TransactionTime_TRC between the TRC-attribute in the child table (child.TRC-attribute) and the TransactionTime column in the parent table, a ValidTime_TRC between TRC-attribute in the child table and the ValidTime column in the parent table (parent.TT). The TRC may include a check constraint defined on the child table that requires for each row of the child table that the TRC be less than or equal to the TransactionTime. The TRC may include that the query selects a ValidTime snapshot from the parent table which is equal to or in the future with respect to a system time. The TRC may include that the query selects a snapshot in TransactionTime from the parent table that is a point-in-time selection or that the query includes a predicate of the form parent.TT CONTAINS child.TRC-attribute. The parent table may be a bi-temporal table having a ValidTime column and a TransactionTime column. The TRC may include a TransactionTime_TRC between the TRC-attribute in the child table (child.TRC-attribute) and the TransactionTime column in the parent table and a ValidTime_TRC between the TRC-attribute in the child table and the ValidTime column in the parent table (parent.TT). The TRC may include a check constraint defined on the child table that requires for each row of the child table that the TRC be less than or equal to the TransactionTime. The TRC may include that the query selects a ValidTime snapshot from the parent table which is in the past with respect to system time. The TRC may include that the query selects a TransactionTime snapshot from the child table at a time less than or equal to the ValidTime snapshot from the parent table. The TRC may include that the query selects a snapshot in TransactionTime from the parent table that is a point-in-time selection or that the query includes a predicate of the form parent.TT CONTAINS child.TRC-attribute.

In one aspect, a method includes a database receiving a query that references a child table and a parent table. A database system determines that referential integrity ("RI") exists between a primary key attribute (pk) in the parent table and a foreign key attribute (fk) in the child table. "Attribute" is defined to mean one or more columns. The database system assuming, without requiring, that a temporal referential constraint (TRC) exists between a period attribute in the parent table and a TRC-attribute in the child table. The TRC-attribute is a date or time attribute. As part of assuming TRC, the database system assumes the period attribute in the parent table includes a TransactionTime column having TransactionTime values, the child table does not include a ValidTime column, the value of the TRC-attribute for a given row identifies a time at which the given row became valid, and wherein the given row is valid from the time specified in the TRC-attribute onward, and the value in the TRC-attribute for the given row exists within the value of the period attribute of a parent table row matched to the given row. The database system determines that the query satisfies non-temporal join elimination conditions. The database system determines that the query satisfies temporal join elimination conditions. The database system determines that the query contains no other qualification conditions on the parent table's period attribute. The database system eliminates the inner join when planning execution of the query. The database system executes the query against the child table without reference to the parent table to produce a result. The database system saves the result.

Implementations may include one or more of the following. The database system may require the TRC to exist between the period attribute in the parent table and the TRC-attribute in the child table.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The technique disclosed herein has particular application, but is not limited, to systems such as the system 100 illustrated in FIG. 1. The system 100 includes a includes a variety of hardware components and software components. The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-9.

The system 100 includes a Database Management System (DBMS) 102, at least one hardware processor 104, and a non-transitory computer-readable storage medium having executable instructions representing a join elimination (JE) technique 106 as disclosed herein.

The DBMS 102 may include a parsing engine 108, discussed below in connection with FIGS. 2 and 3, that organizes the storage of data and the distribution of database table rows, and coordinates the retrieval of data from the data-storage facilities in response to queries received from a user. The DBMS 100 usually receives queries and commands to build tables in a standard format, such as Structured Query Language (SQL).

Figure 2:
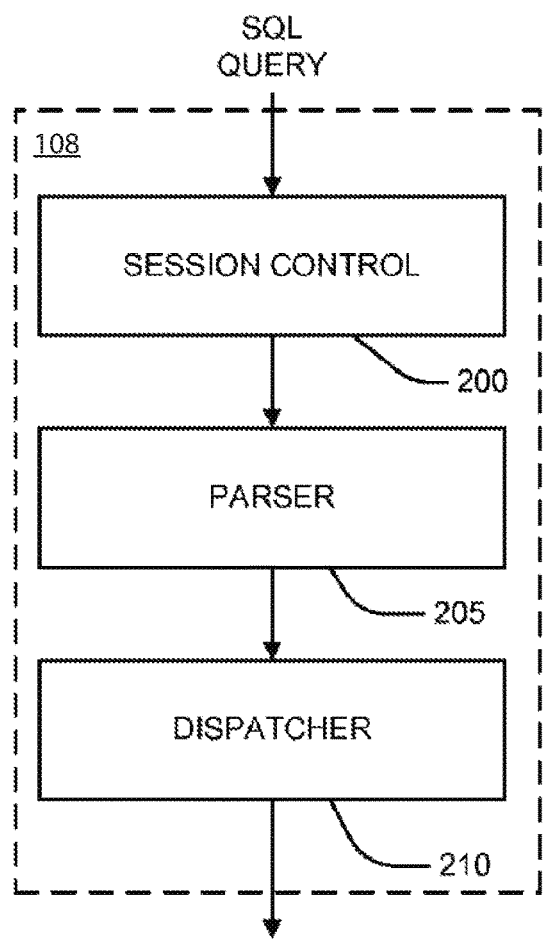
FIG. 2 is one example of a block diagram of a parsing engine.
Figure 3:
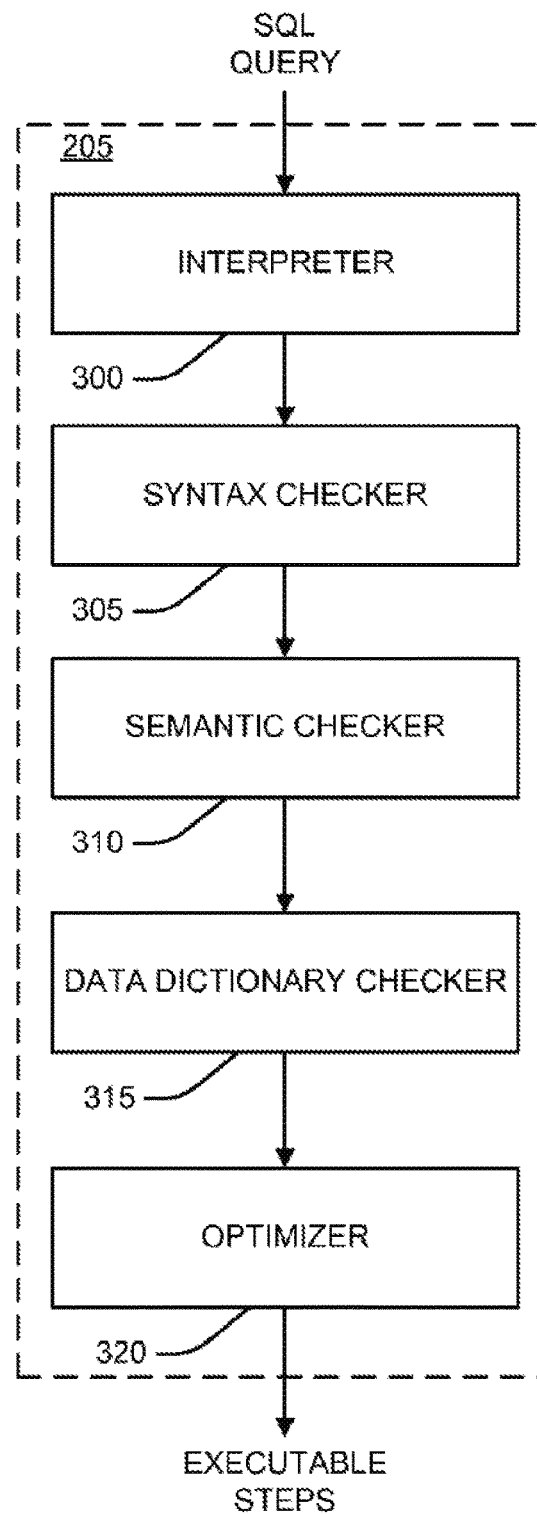
FIG. 3 is a flow chart of a parser.

Once the session control 200, shown in FIG. 2, allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to implement the executable steps.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, such a database may store an inventory history or the movement of employees within an organization. While a conventional database can maintain temporal data, it is typically done using user-defined date or timestamp columns, or the like, which are maintained in a temporal manner with manual coding for data maintenance activities.

In one embodiment, there are three different fundamental kinds of time in a temporal database. The first type uses user-defined times that are un-interpreted time values. Such times typically are defined as DateTime data types or Period data types.

In one embodiment, as is conventional, DateTime and Period data types are intrinsic types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time. Indeed, a table can have an arbitrary number of user-defined times that may have meanings to the database, upstream source systems and/or processes, etc.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

The technique disclosed herein describes a form of JE that can be performed between a child table that is a TransactionTime-only/non-temporal table and a parent table that has TransactionTime column based on a Temporal Relationship Constraint ("TRC") defined in U.S. patent application Ser. No. 16/886,268, entitled Temporal Relationship Constraint in TransactionTime Dimension, filed on May 28, 2020, which is assigned to the assignee of the instant application, incorporated by reference; the relevant content of the referenced application is repeated below.

Material from U.S. Application Ser. No. 16/866,268, Regarding Temporal Relationship Constraint in Transaction-Time Dimension A conventional RI constraint in a temporal database takes time into consideration in its definition. The conventional RI requires:

a. the pk value to be unique at every point in time;

b. the pk and the fk to match during the same period of time; and c. the child and parent tables to have ValidTime columns.

A new temporal Relationship Constraint (TRC) may be created between a child table that is a TransactionTime only/non-temporal table and a parent table that has TransactionTime column. A DATE/TIMESTAMP column in the child table is referred as TRC column in TransactionTime. The requirement that the child table is a TransactionTime only/non-temporal table is inconsistent with the third element of the conventional RI requirements discussed immediately above in which the child table is required to have a ValidTime column.

The normal non-temporal RI apply with the new TRC, that is:

a. each fk data column value must have a matching pk data column value, and b. the pk columns must be temporal unique, which means the pk column must be unique at any point in time.

The TRC column identifies the time value at which the pk row must be valid. Furthermore, the following meaning is associated with the TRC column: it became known to the system at the DateTime specified in the TRC column value and it continues to be known forever from that point onwards. In other words, the TRC column of a child table row must exist in the logically normalized value of TransactionTime column of all the parent rows sharing the same pk value. The "logically normalized" concept is described below in connection with FIG. 4.

The following are the semantics and usage rules of TRC with a TransactionTime column:

1. The parent table must have the TransactionTime dimension. The child table must not contain the ValidTime dimension. The child table may or may not contain the TransactionTime dimension.

2. A set of pk data columns in the parent must be identified along with a set of fk data columns in the child. Each of the sets may be one or more column. One DATE/TIMESTAMP column of the child must be identified as the TRC column.

3. The value of TRC column of a child row must exist within the value of the TransactionTime column of a matching (i.e., in which the pk value=the fk value) parent row. If there are multiple matching parent rows, then TRC column of a child row must exist in the logically normalized value of TransactionTime column of all those parent rows. The "logically normalized" concept is described below in connection with FIG. 4.

Figure 4:
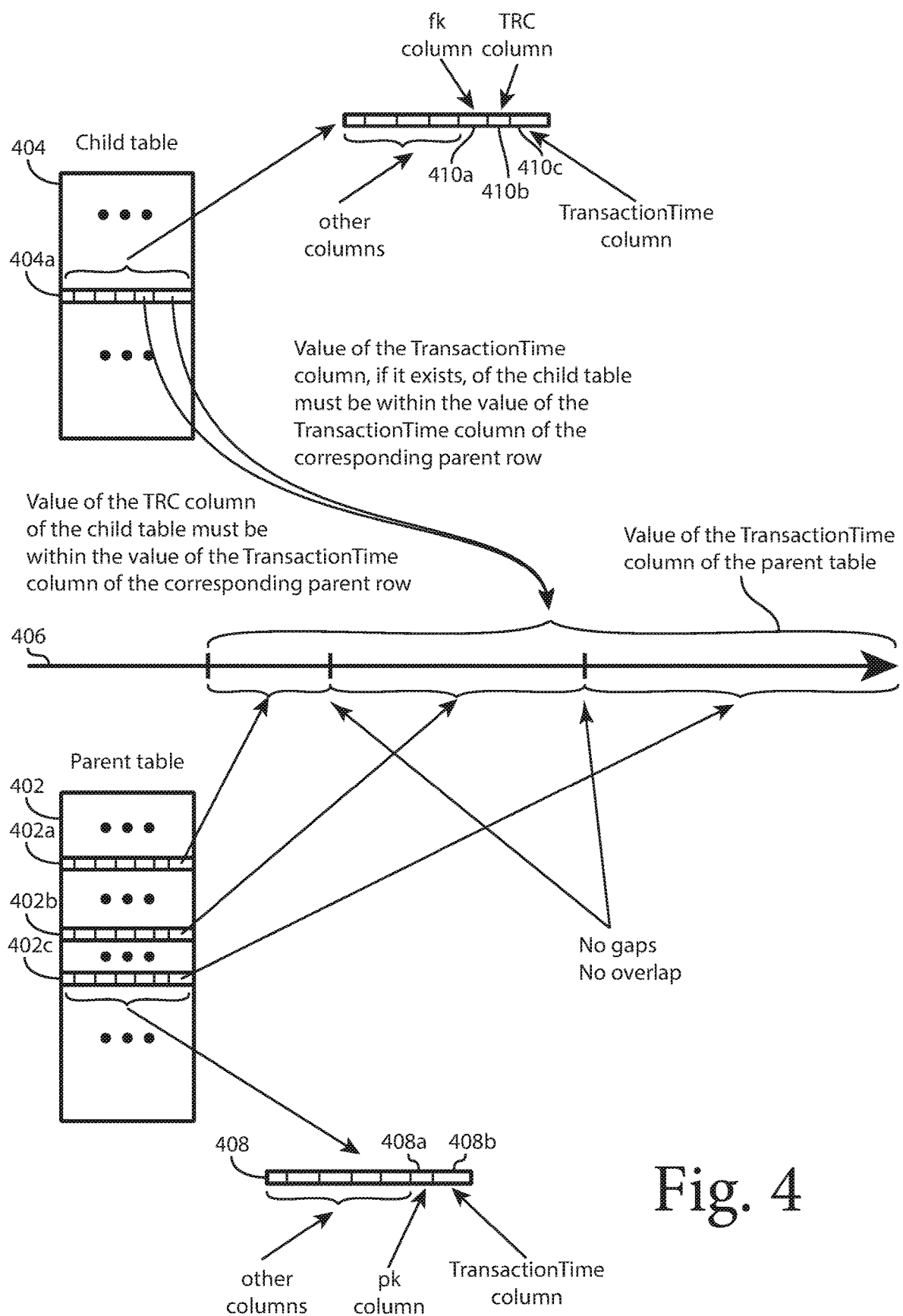
FIG. 4 is a representation of a logically normalized TransactionTime column in a parent table and the relationship between a value of a TransactionTime column in a child table, if the TransactionTime column exists in the child table, to the value of the logically normalized TransactionTime column in the parent table in order to satisfy one of a plurality of requirements for a temporal relationship constraint, and between the value of a temporal referential constraint (TRC) in the child table to the value of the logically normalized TransactionTime column in the parent table in order to satisfy another of a plurality of requirements for a temporal relationship constraint.

4. If the parent has multiple rows with the same pk values, then the TransactionTime column values of the different rows must meet—the TransactionTime column values must not overlap and there must be no gaps between the values of the different parent table rows. In addition, the parent table row must not be a closed row if the child row is present in the child table. For example, a child table that records a claim initiated by a member must be present in some member parent table for all times after the claim is initiated. The "logically normalized" concept is illustrated in FIG. 4, which shows a parent table 402, a child table 404, and a time dimension 406, specifically TransactionTime. The schema 408 for the parent table 402 includes a plurality of "other columns", a pk column 408a, and a TransactionTime column 408b. In the example shown in FIG. 4, the parent table 402 includes 3 rows, 402a, 402b, 402c, that are separated by other rows in the parent table 402 (represented by the ellipses), and that have the same value in their pk columns 408a. When charted on the time domain 406, the TransactionTime of the three rows has no gaps and no overlaps, and thus the TransactionTime dimension of the parent table for the illustrated pk value is "logically normalized." The logically normalized pk value is also not closed because it extends to the end of time. The schema 410 for the child table 404 includes a plurality of "other columns," an fk column 410a, a TRC column 410b, and (optionally) a TransactionTime column 410c. In the example shown in FIG. 4, the child table 404 includes a row 404a that has a value in its fk column that matches the pk value of the parent table rows 402a, 402b, 402c. If the child table 404 includes a TransactionTime column, this requirement for RI is satisfied if the value of the TransactionTime column of row 404a is within the value of the logically normalized values of the TransactionTime columns of rows 402a, 402b, 402c of the parent table 402.

5. If the child table has TransactionTime dimension the value of TransactionTime column of a child table row must be contained in the value of TransactionTime column of a corresponding parent table row. If there are multiple corresponding parent table rows, then value of TransactionTime column of child row must be contained in the logically normalized value of TransactionTime column of all those parent rows. This is illustrated in FIG. 4 and discussed above.

Consider as an example, an insurance domain application, including two TransactionTime tables, "claim" and "member," and a semantic view, semantic_claim, that is created by joining these two table as shown below.

```
/* Parent table*/
CREATE MULTISET TABLE member
  ( member_id              INTEGER NOT NULL, /* PRIMARY KEY */
    member_nm              VARCHAR (100 ) ,
    gender_cd              CHAR(1) NOT NULL,
    marital_status_cd      CHAR(1),
    birth_dt               DATE,
    snapshot_pd_start      TIMESTAMP (6) WITH TIME ZONE NOT NULL,
    snapshot_pd_end        TIMESTAMP (6) WITH TIME ZONE NOT NULL,
    PERIOD FOR snapshot_pd (snapshot_pd_start, snapshot_pd_end) AS
TRANSACTIONTTME /*TRANSACTIONTIME COLUMN*/
) PRIMARY INDEX (member_id);
```

```
/* Child table*/
CREATE MUTLISET TABLE claim
  ( claim id               INTEGER NOT NULL, /* PRIMARY KEY */
    claim_amt              DECIMAL (15, 2) NOT NULL,
    member_id              INTEGER NOT NULL, /*FORE1GN KEY*/
    claim_status_cd        CHAR(1) NOT NULL,
    claim_adjudication_dts TIMESTAMP (6),
    snapshot_pd_start      TIMESTAMP (6) WITH TIME ZONE NOT NULL,
    snapshot_pd_end        TIMESTAMP (6) WITH TIME ZONE NOT NULL,
    PERIOD FOR snapshot_pd (snapshot_pd_start, snapshot_pd_end) AS
TRANSACTIONTIME /* TRANSACTIONTIME COLUMN * /
) PRIMARY INDEX (claim_id);
```

```
/*Semancic view*/
CREATE VIEW semantic_claim AS SEQUENCED TRANSACTIONTIME
SELECT claim.claim_id,
       claim.member_id,
       claim.claim_amt ,
       claim.claim_adjudication_dts ,
       member.birth_dt.
       member.member_nm FROM claim, member WHERE claim.member_id =
member.member_id;
```

Table: member

| member_id | member_nm | gender_cd | marital_status_cd | birth_dt | snapshot_pd_start | snapshot_pd_end |
|---|---|---|---|---|---|---|
| 1000 | John Doe | M | S | 1987-03-03 | 2018-01-03 10:00:00:0000000 | UNTIL_CLOSED |

Table: claim

| claim_id | claim_amt | member_id | Claim_status_cd | Claim_adjudication_dts | snapshot_pd_start | snapshot_pd_end |
|---|---|---|---|---|---|---|
| 200 | 1500.59 | 1000 | P | 2015-06-08 10:00:00:000000 | 2018-06-12 10:00:00:000000 | UNTIL_CLOSED |

The illustrated row in the claim table holds an invalid record for a member_id=1000, since a claim cannot be adjudicated as at 2015-06-08. As can be seen in the member table, the member is valid only from '2018-01-03 10:00:00'. That is, in the claim table, the TRC column is the "claim adjudication_dts" column. The value of that column for the claim_id=200 row, i.e., "2015-06-08 10:00:00:000000," does not fit within the range of the parent table's logically normalized value of the TransactionTime column of the parent table row for which the parent key, i.e., the "member_id" in the example, matches the foreign key of the child row being modified, i.e., the "member_id" in the example, i.e., from "2018-01-03 10:00:00:0000000" (the value of the snapshot_pd_start field in the parent table row with "member_id"=1000) until "UNTIL_CLOSED" (the value of the snapshot_pd_end field in the parent table row with "member_id"=1000). As such, the new TRC would result in the rejection of the addition of the claim_id=200 row or the modification to such row to modify the claim_adjudication-_dts field to include the date and time shown above. That is, the new TRC may prevent the insertion of incorrect details into the claim table or can prevent addition of an incorrect record into the claim table.

The preceding example is of a "hard RI" in which the DBS 100 verifies the creation and modification of database rows by confirming they comply with the semantics and usage rules of TRC with a TransactionTime column and the optimizer (block 320, FIG. 3) uses the semantics and usage rules of TRC with a TransactionTime column in optimizing execution of a query. In "soft RI," the DBS 100 does not perform the verifying function, thereby avoiding incurring the overhead of enforcing the semantics and rules, but the optimizer (block 320, FIG. 3) assumes the semantics and rules have been complied with and uses the semantics and usage rules of TRC with a TransactionTime column in optimizing execution of a query.

Extension of JE Rewrite Optimization for a Join Between a Child Table that is a TransactionTime-Only/Non-Temporal Table and a Parent Table that has TransactionTime Column Non-temporal JE conditions are typically not enough to remove a redundant join involving one or more temporal tables. As such, JE rewrite optimization for such joins can be done safely for only a few circumstances. The technique described herein identifies circumstances under which the inner join elimination rules can be extended for joins between a child table that is a TransactionTime-only/non-temporal table and a parent table that has TransactionTime column.

Defining a TRC, such as that described in the section above containing material from U.S. patent application Ser. No. 16/866,268, between a child table that is a Transaction-Time only/non-temporal table and a parent table that has a TransactionTime column, allows JE to be extended for the below scenarios, assuming the query already satisfies the non-temporal JE conditions described in the background section. Recall that the TRC identifies the time value at which the pk row must be valid.

The following table definitions and semantic views will be used in the discussions of scenarios set out below in which JE can be extended.

```
/* Parent table*/
    CREATE MULTISET TABLE member
        (member_id          VARCHAR (20) NOT NULL, /* PRIMARY KEY */
        member_name         VARCHAR (100),
        location            VARCHAR (100),
        department_id       INTEGER,
        birth_dt            DATE,
        snapshot_pd_start   TIMESTAMP (6) WITH TIME ZONE NOT NULL,
        snapshot_pd_end     TIMESTAMP (6) WITH TIME ZONE NOT NULL,
        PERIOD FOR snapshot_pd (snapshot_pd_start, snapshot_pd_end) AS
TRANSACTIONTIME /* TRANSACTIONTIME COLUMN */
) PRIMARY INDEX (member_id);
```

```
/* Child table*/
    CREATE MULTISET TABLE claim
        (claim_id               VARCHAR (20),
        claim_amt               DECIMAL (15, 2) NOT NULL,
        member_id               VARCHAR (20) NOT NULL, /*FOREIGN KEY*/
        description             VARCHAR (100),
        claim_adjudication_dts  TIMESTAMP (6),
        snapshot_pd_start       TIMESTAMP (6) WITH TIME ZONE NOT NULL,
        snapshot_pd_end         TIMESTAMP (6) WITH TIME ZONE NOT NULL,
        PERIOD FOR snapshot_pd (snapshot_pd_start, snapshot_pd_end) AS
    TRANSACTIONTIME /* TRANSACTIONTIME COLUMN */
) PRIMARY INDEX (claim_id);
```

```
/*Semantic view*/
    CREATE VIEW semantic_claim AS
    SEQUENCED TRANSACTIONTIME SELECT claim.claim_id,
    claim.member_id,
    claim.cla im_amt,
    claim.claim_adjudication_dts,
    member.birth_dt,
    member.member_name FROM claim, member
    WHERE claim.member_id = member.member_id;
```

Note that a sequenced query or view, as in the above semantic view, is a SELECT statement that extracts and operates on rows in a valid-time or bitemporal table with valid-time periods that overlap a time period specified in the query (the PA of the query). If no time period is explicitly specified in the query, as in the above semantic view, the default PA is all time, and the query applies to all open rows in the table. Such queries can return rows that are history rows, current rows, future rows, or combinations of the three. A sequenced query produces a temporal table as a result set. The valid time of the result rows is the overlap of the query PA with the original row period of validity (PV).

Scenario 1 where JE can be extended—Parent table selected in current or future.

Figure 5:
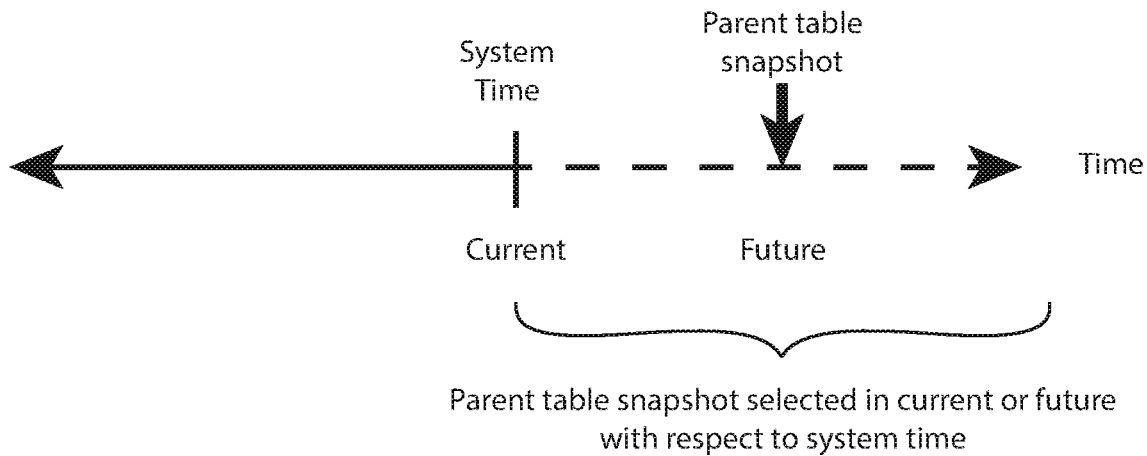
FIG. 5 illustrates a scenario in which JE can be extended where a parent table snapshot is selected in current or future.

FIG. 5 is an illustration of Scenario 1. In Scenario 1, the query selects a snapshot from the parent table (where a snapshot is the point in time selected in a table) which is in current (i.e., equal to) or in the future with respect to system time, where "system time" is defined to be the current time as kept by the system on which the parent resides, which is typically the current time of day as that term is generally understood. Note that even if the child table resides on a different system than the parent table, the system time is typically, although not strictly necessarily, the same for the child table as it is for the parent system.

To illustrate, assume that the current system time is T20 and the parent table snapshot is selected at T25 (where increasing "T" numbers indicate increases in time) as shown in the following example tables and query (hereinafter, the "Scenario 1 Example"; note that the tables in this and the following scenarios represent only a subset of the columns and rows in the member table and the claim table):

| Table:member | | Table:claim | | |
|---|---|---|---|---|
| member_id | snapshot_pd | claim_id | member_id | claim_adjudication_dts |
| Mid20 | 'T5' - UC | cid20 | Mid20 | 'T13' |
| Mid21 | 'T1' - UC | cid21 | Mid21 | 'T2' |

SELECT claim-id FROM claim, member TRANSACTIONTIME AS OF 'T25' WHERE claim.member_id = member.member_id;

In this and the following examples, "UC" indicates "until closed" (so that, for example, a value of T5—UC means "T5 until closed"), the member table is the parent table, and the claim table is the child table.

In the Scenario 1 Example, the parent table is a TransactionTime table and the child table is a TransactionTime table. The parent table snapshot is at T25, which is in the future with respect to current system time. As a result, both of the parent table rows are valid (that is, the snapshot is taken during the periods in the TransactionTime column of the parent table, i.e., the snapshot_pd column) and the query does not reference the TransactionTime row of the claim table, i.e., the claim-adjudication-date column. As a result, the inner join between the member table and the child table can be eliminated, reducing the query to:

SELECT Customer-id FROM claim TRANSACTIONTIME AS OF 'T25';

Scenario 2 where JE can be extended—Parent table selected in history (say at time t1).

The query selects a snapshot from the parent which is in history (i.e., in the past) with respect to system time and either of the conditions specified in Scenario 2A or the conditions specified in Scenario 2B are satisfied.

Figure 6:
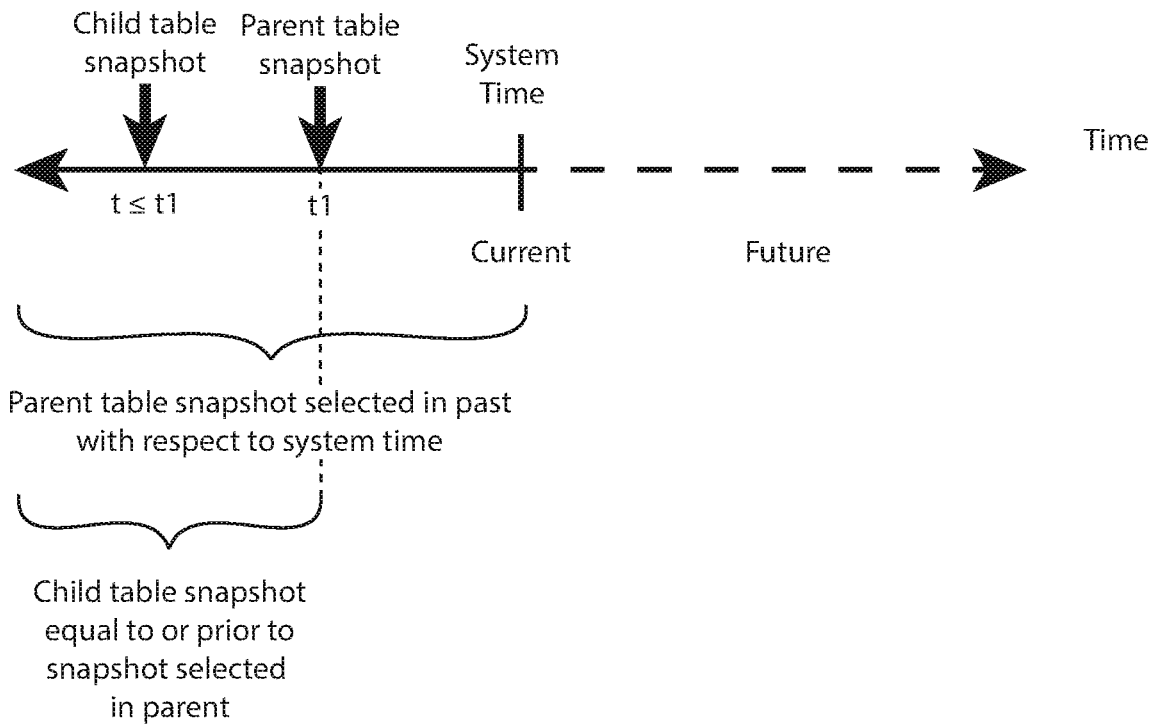
FIG. 6 illustrates a scenario in which JE can be extended where a parent table snapshot is selected in history.
Figure 7:
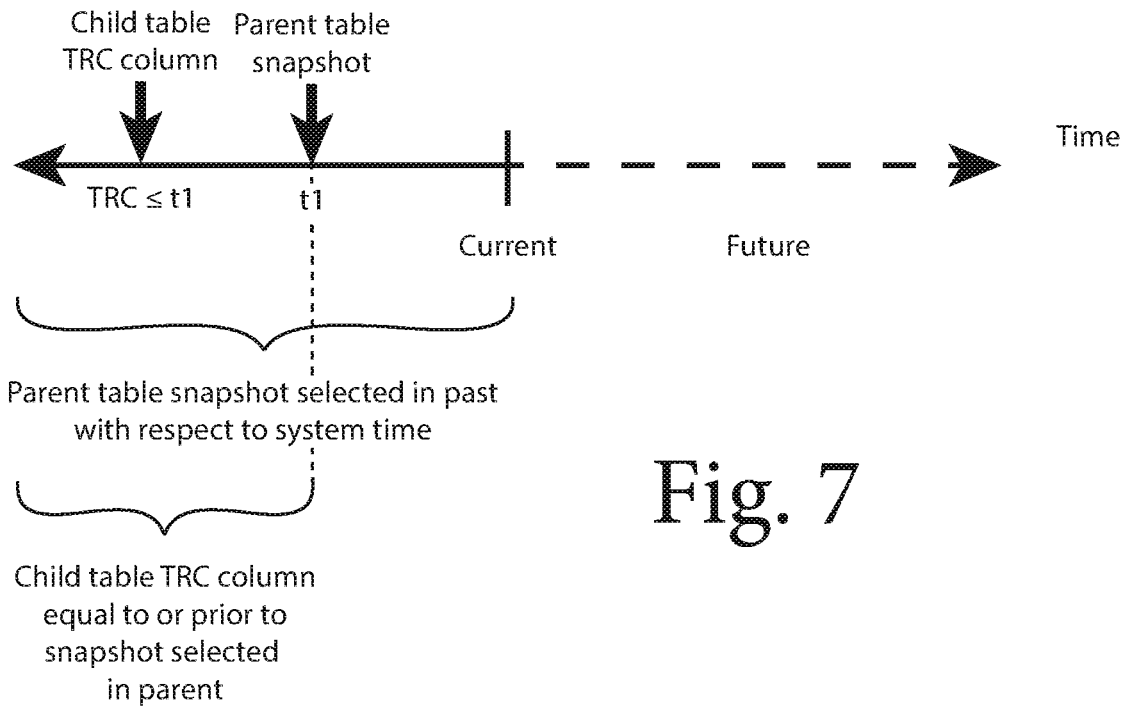
FIG. 7 illustrates a scenario in which JE can be extended where a parent table snapshot is selected in the past with respect to system time and a child table TRC column is equal to or prior to the snapshot selected in the parent.

Scenario 2A where JE can be extended. FIG. 6 illustrates scenario 2A. The query selects a snapshot from the child table which is equal to or prior to the snapshot selected in the parent. For example, assume that the current system time is T20 and the parent table snapshot is selected at T4 as shown in the following example tables and query (hereinafter, the "Scenario 2A Example"):

| Table:member | | Table:claim | | |
|---|---|---|---|---|
| member_id | snapshot_pd | claim-id | member_id | claim_adjudication_dts |
| Mid20 | 'T5' - UC | cid20 | Mid20 | 'T13' |
| Mid21 | 'T1' - UC | cid21 | Mid21 | 'T2' |

SELECT claim_id FROM claim, member TRANSACTIONTIME AS OF 'T4' WHERE claim.member_id = member.member_id;

In the Scenario 2B Example, the parent table is a TransactionTime table and the child table is a TransactionTime table. The parent table snapshot and the child table snapshot are at T4, which is in the past with respect to current system time (T20). As a result, only the Mid21 rows in the member table and the claim table are valid. That is, the Mid20 rows in the member table and the claim table do not become valid until T5 and T13, respectively.

The member table's member_id column is the pk and the child-table's member_id column is the fk and it can be assumed that non-temporal RI has been enforced. As a result, since non-temporal RI requires the pk to equal the fk, the inner join can be eliminated and the claim reduces to:

SELECT claim_id FROM claim TRANSACTIONTIME AS OF 'T4';

Scenario 2B where JE can be extended. The query selects only those child table rows whose TRC column (discussed in U.S. patent application Ser. No. 16/866,268, which is cited above and which is quoted extensively above) value is equal to or prior to the snapshot selected in the parent. This means the query must have a predicate of the form child.TRCcolumn <=t1. For example, assume that the current system time is T20 and the parent table snapshot is selected at T4 as shown in the following example tables and query (hereinafter, the "Scenario 2B Example"):

| Table:member | | Table:claim | | |
| --- | --- | --- | --- | --- |
| member_id | snapshot_pd | claim-id | member_id | claim_adjudication_dts |
| Mid20 | 'T5' - UC | cid20 | Mid20 | 'T13' |
| Mid21 | 'T1' - UC | cid21 | Mid21 | 'T2' |

SELECT customer_id FROM claim, member TRANSACTIONTIME AS OF 'T4' WHERE claim.member_id = member.member_id and claim.claim_adjudication_dts <= T4;

In the Scenario 2B Example, the parent table snapshot and the child table snapshot are at T4, which is in the past with respect to current system time (T20). As a result, only the Mid21 rows in the member table and the claim table are valid for the purposes of the query. That is, the Mid20 rows in the member table and the claim table do not become valid until T5 and T13, respectively.

Knowing that the member table's member_id column is the pk and the child-table's member_id column is the fk and assuming that non-temporal RI has been enforced, which requires the pk to equal the fk, the inner join between the member table and the claim table (i.e., the first half of the WHERE clause) can be eliminated. Further, since TRC is being enforced (or with soft RI, is assumed to be complied with), the TRC column (claim.claim_adjustment_dts) must be within the value of the TransactionTime column of the matching parent table row (i.e., the row for which the fk of the child table row in question matches the pk of the parent table row), the second half of the WHERE clause can be eliminated (the parent table snapshot is at T4 and, under TRC, the TRC column must be equal to or prior to the parent table snapshot, so the WHERE clause checking that the TRC column is less than the time of the parent table snapshot, is not needed), reducing the query to:

SELECT customer_id FROM claim, member TRANSACTIONTIME AS OF 'T4;

Scenario 3 where JE can be extended. The query includes a WHERE clause of the form parent.TransactionTime CONTAINS child.TRCcolumn. The CONTAINS operator evaluates two Period expressions (parent.TransactionTime and child.TRCcolumn in this case), or derived periods, or DateTime expressions to TRUE, FALSE, or UNKNOWN as follows:

If both expressions have a Period data type or a derived period, the function returns TRUE if the beginning bound of the first expression (parent.TransactionTime in this case) is less than or equal to the beginning bound of the second expression (child.TRCcolumn) and the ending bound of the first expression is greater than or equal to the ending bound of the second expression; otherwise, the function returns FALSE.

If the first expression is a Period expression or a derived period and the second expression is a DateTime expression, the function returns TRUE if the beginning bound of the Period expression or derived period is less than or equal to the DateTime expression and the ending bound of the Period expression or derived period is greater than the DateTime expression; otherwise, the function returns FALSE.

If the first expression is a DateTime expression and the second expression is a Period expression, the function returns TRUE if the DateTime expression is less than or equal to beginning bound of the Period expression and the DateTime expression plus one granule is greater than or equal to the ending bound of the Period expression; otherwise, the function returns FALSE.

If either expression is NULL, the operator returns UNKNOWN.

The query selects a portion of rows from the parent table for which the TRC-column is contained in the parent's TransactionTime column. This means the query must contain a condition of the form parent.TransactionTime CONTAINS child.TRCcolumn. Further, there can be no other qualification conditions on the parent's TransactionTime column. For example, assume the following example tables and query (hereinafter, the "Scenario 3 Example"):

| Table:member | | Table:claim | | |
| --- | --- | --- | --- | --- |
| member_id | snapshot_pd | claim-id | member_id | claim_adjudication_dts |
| Mid20 | 'T5' - UC | cid20 | Mid20 | 'T13' |
| Mid21 | 'T1' - UC | cid21 | Mid21 | 'T2' |

SELECT customer_id FROM claim, member NONSEQUENCED TRANSACTIONTIME WHERE claim.member_id = member.member_id and membership.snapshot_pd CONTAINS claim.claim_adjudication_dts;

Note that a nonsequenced query, as in the query in the Scenario 3 Example, is a SELECT statement that treats temporal columns of temporal tables as if they were non-temporal columns. It does not place any special semantics on temporal columns. It considers all states simultaneously.

Since the TRC requires that the value of the TransactionTime column of the child table, if it exists (as it does in this case), must be within the value of the TransactionTime column of the corresponding parent row, see discussion above in connection with FIG. 4, the CONTAINS clause of the query can be eliminated. Further, knowing that the member table's member_id column is the pk and the child table's member_id column is the fk and that temporal RI has been enforced, which requires the pk to equal the fk, the "claim.member_id=member.member_id" clause of the query can be eliminated. As such, the query reduces to:

SELECT customer_id FROM claim;

Scenario 4 where JE can be extended. In addition to the above-mentioned scenarios, if the child is a TransactionTime only table and the parent is a bi-temporal table, JE can be extended if all the below conditions are satisfied:

TRC is defined on both dimensions (i.e., a TransactionTime_TRC is defined between the TRC-attribute in the child table and the TransactionTime dimension of the parent table and a ValidTime_TRC is defined between the TRC-attribute in the child table and the ValidTime dimension of the parent table);

a CHECK constraint is defined on the child table: CURRENT TRANSACTIONTIME CHECK (TRC Column <=BEGIN(ChildTransactionTimeTColumn))

Figure 8:
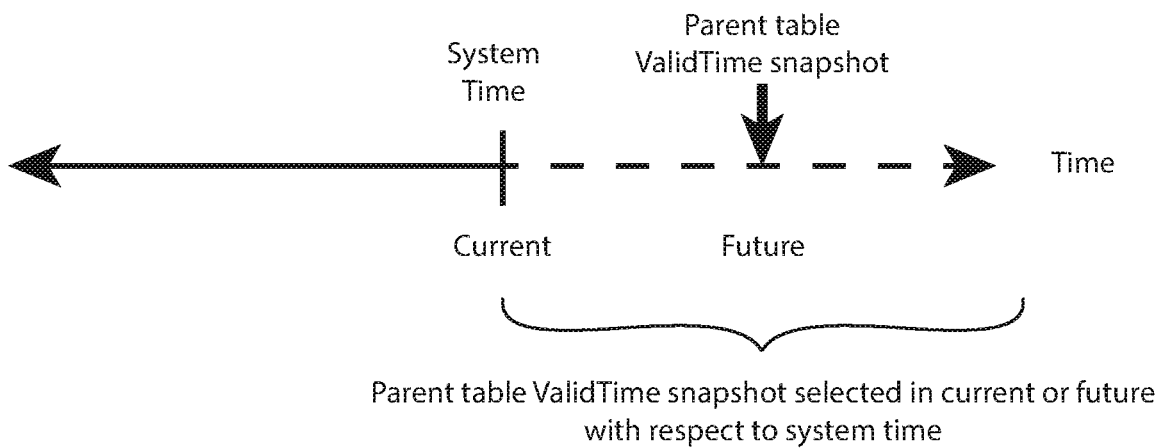
FIG. 8 illustrates a scenario in which JE can be extended where a parent table ValidTime snapshot is selected in current or future.
Figure 9:
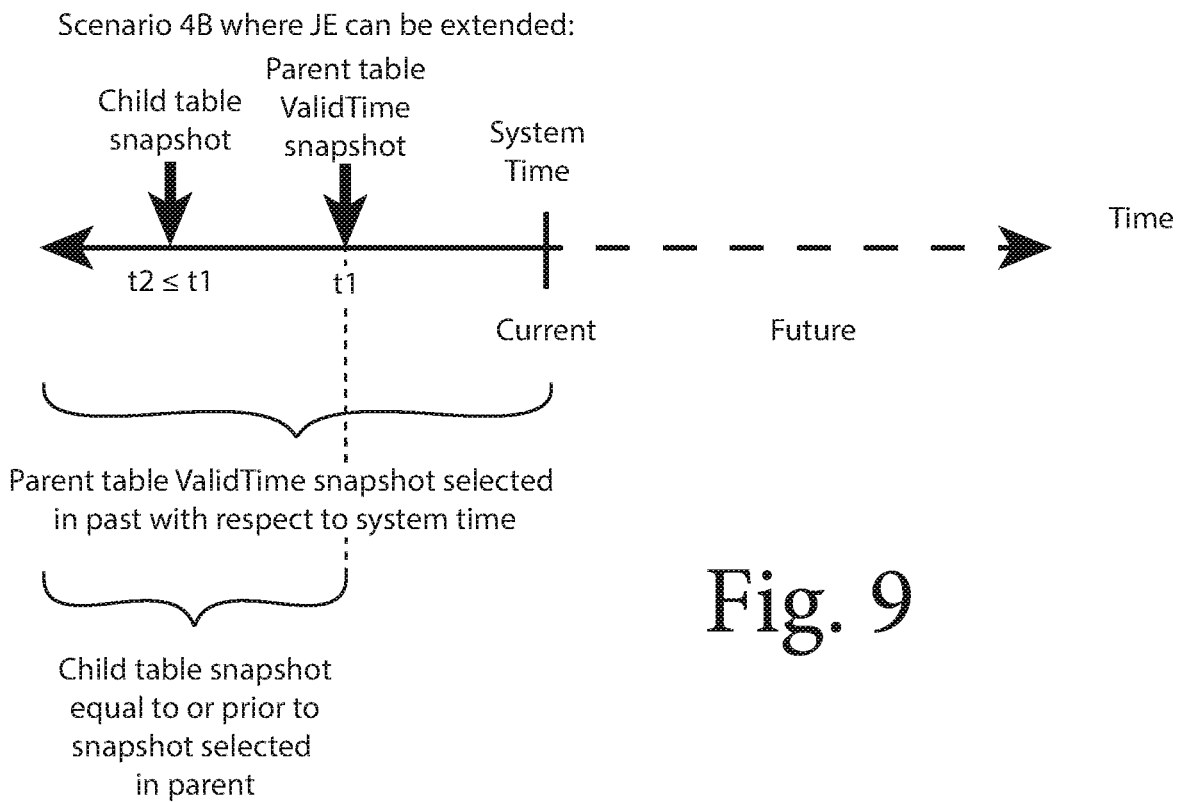
FIG. 9 illustrates a scenario in which JE can be extended where a parent table ValidTime snapshot is selected in the past with respect to system time and a child table TRC column is equal to or prior to the snapshot selected in the parent.

The query satisfies the any of the following conditions along with non-temporal JE conditions:

Scenario 4A where JE can be extended—the query selects a snapshot in the ValidTime dimension from the parent which is in current or in future with respect to system time, as shown in FIG. 8, or Scenario 4B where JE can be extended—the query selects a snapshot in the ValidTime dimension from the parent (say at time t1) which is in history with respect to system time and the query selects a snapshot from child (say at time t2), then the condition t2≤t1 must be satisfied, as shown in FIG. 9.

Note: In this additional scenario, the query is required to select a snapshot from the parent table in the TransactionTime dimension either in point-in-time selection or the query must have predicate of the form parent.TransactionTime CONTAINS child.TransactionTime_TRC.

This new form of JE requires that the join be based on a time condition between the child and the parent—the time when the child transaction occurred is contained in the parent's TransactionTime validity. It also requires that the parent pk to be temporally unique, i.e. the pk value must be unique at any point in time. This guarantees that the TRC-column will be contained in only one parent row. Therefore, the join will select only one parent row. This is the reason for eliminating the join.

Consider below insurance domain application, where two TransactionTime tables claim and member, and a semantic view semantic_claim that is created by joining these two table as shown below.

```
/* Parent table*/
    CREATE MULTISET TABLE member
        ( member_id          VARCHAR (20) NOT NULL, /* PRIMARY KEY */
          member_name        VARCHAR (100),
          location           VARCHAR (100),
          department_id      INTEGER,
          birth_dt           DATE,
          snapshot_pd_start  TIMESTAMP (6) WITH TIME ZONE NOT NULL,
          snapshot_pd_end    TIMESTAMP (6) WITH TIME ZONE NOT NULL,
          PERIOD FOR snapshot_pd (snapshot_pd_ start, snapshot _pd_end)
    AS TRANSACTIONTIME /* TRANSACTIONTIME COLUMN */
    ) PRIMARY INDEX (member_id);
```

```
/* Child table*/
    CREATE MULTISET TABLE claim
        (claim_id              VARCHAR (20) ,
         claim_amt             DECIMAL (15, 2) NOT NULL,
         member_id             VARCHAR (20) NOT NULL, /*FOREIGN KEY*/
         description           VARCHAR (100),
         claim_adjudication_dts TIMESTAMP (6) ,
         snapshot_pd_start     TIMESTAMP (6) WITH TIME ZONE NOT NULL,
         snapshot_pd_end       TIMESTAMP (6) WITH TIME ZONE NOT NULL,
         PERIOD FOR snapshot_pd (snapshot_pd_start, snapshot_pd_end)
    AS TRANSACTIONTIME /* TRANSACTIONTIME COLUMN */
    ) PRIMARY INDEX (claim id);
```

```
/* Semantic view*/
CREATE VIEW semantic_claim AS
SEQUENCED TRANSACTIONTIME SELECT claim.claim_id,
    claim.member_id,
    claim.claim_amt,
    claim.claim_adjudication_dts,
    member.birth_dt,
    member.member_name FROM claim, member
    WHERE claim.member_id = member.member_id;
```

Table: member

| member_id | member_name | location | department_id | birth_dt | snapshot_pd_start | snapshot_pd_end |
|---|---|---|---|---|---|---|
| MID20 | Roy | UK | 1001 | 1987-03-03 | 2008-01-03 10:00:00:0000000 | UNTIL_CLOSED |

Table: claim

| claim_id | claim_amt | member_id | description | claim_adjudication_dts | snapshot_pd_start | snapshot_pd_end |
|---|---|---|---|---|---|---|
| cid20 | 15000 | MID20 | Health Insurance | 2015-06-08 10:00:00:000000 | 2015-06-12 10:00:00:000000 | UNTIL_CLOSED |

Query:
TRANSACTIONTIME AS OF TIMESTAMP '2016-01-01 12:00:00.000000'
  SELECT semantic_claim.claim_id,
  semantic_claim.claim_amt FROM semantic_claim
  WHERE semantic_claim.member_id='Mid20' AND
  semantic_claim.claim_adjudication_dts BETWEEN TIMESTAMP '2015-06-01 12:00:00.000000' AND TIMESTAMP '2015-06-15 12:00:00.000000';

The AS OF qualifier and the WHERE clause will be applied to the query in semantic_claim view. As a claim cannot be initiated until the person is a member, for all rows that satisfy claim.member_id=member.member_id, the "semantic_claim.claim_adjudication_dts "BETWEEN TIMESTAMP '2015-06-01 12:00:00.000000' AND TIMESTAMP '2015-06-15 12:00:00.000000'" ensures that only those claims which were initiated between TIMESTAMP '2015-06-01 12:00:00.000000' AND TIMESTAMP '2015-06-15 12:00:00.000000' are selected and one corresponding row is qualified in the member table with the AS OF qualifier. So, it is valid to eliminate the member table from the query in the semantic_claim view.

Further examples consistent with the present teaching are set out in the following numbered clauses.

Clause 1. A method comprising:
a database system receiving a query;
the database system determining that the query includes an inner join between a parent table and a child table;
the database system determining that the following relationships exist between the parent table and the child table:
  referential integrity ("RI") between a primary key attribute (pk) in the parent table and a foreign key attribute (fk) in the child table, where "attribute" is defined to mean one or more columns; and
  a temporal relationship constraint ("TRC") between a period attribute in the parent table and a TRC-attribute in the child table, the TRC-attribute being a date or time attribute, wherein the TRC requires that:
    the period attribute in the parent table includes a TransactionTime column having TransactionTime values,
    the child table does not include a ValidTime column,
    the value of the TRC-attribute for a given row identifies a time at which the given row became valid, and wherein the given row is valid from the time specified in the TRC-attribute onward, and
    the value in the TRC-attribute for the given row exists within the value of the period attribute of a parent table row matched to the given row;
determining that the query satisfies non-temporal join elimination conditions;
determining that the query satisfies temporal join elimination conditions;
determining that the query contains no other qualification conditions on the parent table's period attribute;
eliminating the inner join when planning execution of the query;
executing the query against the child table without reference to the parent table to produce a result; and
saving the result.

Clause 2. The method of clause 1 wherein determining that the query satisfies temporal join elimination conditions includes:
  determining that the query selects a snapshot from the parent table which is equal to or in the future with respect to a system time.

Clause 3. The method of clause 1 wherein determining that the query satisfies temporal join elimination conditions includes:
  determining that the query selects a snapshot from the parent table which is in the past with respect to system time; and
  determining that the query selects a snapshot from the child table which is equal to or prior to the snapshot selected from the parent table.

Clause 4. The method of clause 1 wherein determining that the query satisfies temporal join elimination conditions includes:
  determining that the query selects a snapshot from the parent table which is in the past with respect to system time; and
  determining that the query selects only rows from the child table for which the TRC-attribute is contained in the period attribute of the parent table.

Clause 5. The method of clause 4 wherein determining that the query selects only rows from the child table for which the TRC-attribute is contained in the period attribute of the parent table includes:
  determining that the query includes a predicate requiring the TRC-attribute to be less than or equal to the time of the snapshot from the parent table.

Clause 6. The method of clause 1 wherein determining that the query satisfies temporal join elimination conditions includes:
  determining that the query selects only rows from the parent table for which the TRC-attribute is contained in the period attribute of the parent table.

Clause 7. The method of clause 6 wherein determining that the query selects only rows from the parent table for which the TRC-attribute is contained in the period attribute of the parent table includes determining that the query contains a WHERE clause of the form parent.TransactionTime CONTAINS child.TRCcolumn, where parent.TransactionTime is the period attribute in the parent table and child.TRCcolumn is the TRC-attribute in the child table.

Clause 8. The method of clause 1 wherein the parent table is a bi-temporal table having a ValidTime column and a TransactionTime column and wherein:
  the TRC comprises:
    a TransactionTime_TRC between the TRC-attribute in the child table (child.TRC-attribute) and the TransactionTime column in the parent table (parent.TT);
    a ValidTime_TRC between the TRC-attribute in the child table and the ValidTime column in the parent table;

a check constraint is defined on the child table that requires for each row of the child table that the TRC be less than or equal to the TransactionTime;

that the query selects a ValidTime snapshot from the parent table which is equal to or in the future with respect to a system time; and that the query selects a snapshot in TransactionTime from the parent table that is a point-in-time selection or that the query includes a predicate of the form parent.TT CONTAINS child.TRC-attribute.

Clause 9. The method of either of clauses 1 or 8 wherein the parent table is a bi-temporal table having a ValidTime column and a TransactionTime column and wherein:

the TRC comprises:
  a TransactionTime_TRC between the TRC-attribute in the child table (child.TRC-attribute) and the TransactionTime column in the parent table (parent.TT);
  a ValidTime_TRC between the TRC-attribute in the child table and the ValidTime column in the parent table (parent.TT);
  a check constraint is defined on the child table that requires for each row of the child table that the TRC be less than or equal to the TransactionTime;
  that the query selects a ValidTime snapshot from the parent table which is in the past with respect to system time;
  that the query selects a TransactionTime snapshot from the child table at a time less than or equal to the ValidTime snapshot from the parent table; and
  that the query selects a snapshot in TransactionTime from the parent table that is a point-in-time selection or that the query includes a predicate of the form parent.TT CONTAINS child.TRC-attribute.

Clause 10. A non-transitory computer-readable tangible medium, on which is recorded a computer program, the computer program comprising executable instructions, that, when executed, perform a method comprising:

a database system determining that the query includes an inner join between a parent table and a child table;

the database system determining that the following relationships exist between the parent table and the child table:
  referential integrity ("RI") between a primary key attribute (pk) in the parent table and a foreign key attribute (fk) in the child table, where "attribute" is defined to mean one or more columns; and
  a temporal relationship constraint ("TRC") between a period attribute in the parent table and a TRC-attribute in the child table, the TRC-attribute being a date or time attribute, wherein the TRC requires that:
    the period attribute in the parent table includes a TransactionTime column having TransactionTime values,
    the child table does not include a ValidTime column,
    the value of the TRC-attribute for a given row identifies a time at which the given row became valid, and wherein the given row is valid from the time specified in the TRC-attribute onward, and
    the value in the TRC-attribute for the given row exists within the value of the period attribute of a parent table row matched to the given row;

determining that the query satisfies non-temporal join elimination conditions;

determining that the query satisfies temporal join elimination conditions;

determining that the query contains no other qualification conditions on the parent table's period attribute;

eliminating the inner join when planning execution of the query;

executing the query against the child table without reference to the parent table to produce a result; and saving the result.

Clause 11. The non-transitory computer-readable tangible medium of clause 10 wherein determining that the query satisfies temporal join elimination conditions includes:

determining that the query selects a snapshot from the parent table which is equal to or in the future with respect to a system time.

Clause 12. The non-transitory computer-readable tangible medium of clause 10 wherein determining that the query satisfies temporal join elimination conditions includes:

determining that the query selects a snapshot from the parent table which is in the past with respect to system time; and determining that the query selects a snapshot from the child table which is equal to or prior to the snapshot selected from the parent table.

Clause 13. The non-transitory computer-readable tangible medium of clause 10 wherein determining that the query satisfies temporal join elimination conditions includes:

determining that the query selects a snapshot from the parent table which is in the past with respect to system time; and determining that the query selects only rows from the child table for which the TRC-attribute is contained in the period attribute of the parent table.

Clause 14. The non-transitory computer-readable tangible medium of clause 13 wherein determining that the query selects only rows from the child table for which the TRC-attribute is contained in the period attribute of the parent table includes:

determining that the query includes a predicate requiring the TRC-attribute to be less than or equal to the time of the snapshot from the parent table.

Clause 15. The non-transitory computer-readable tangible medium of claim 10 wherein determining that the query satisfies temporal join elimination conditions includes:

determining that the query selects only rows from the parent table for which the TRC-attribute is contained in the period attribute of the parent table.

Clause 16. The non-transitory computer-readable tangible medium of clause 15 wherein determining that the query selects only rows from the parent table for which the TRC-attribute is contained in the period attribute of the parent table includes determining that the query contains a WHERE clause of the form parent.TransactionTime CONTAINS child.TRCcolumn, where parent.TransactionTime is the period attribute in the parent table and child.TRCcolumn is the TRC-attribute in the child table.

Clause 17. The non-transitory computer-readable tangible medium of clause 10 wherein the parent table is a bi-temporal table having a ValidTime column and a TransactionTime column and wherein:

the TRC comprises:
  a TransactionTime_TRC between the TRC-attribute in the child table (child.TRC-attribute) and the TransactionTime column in the parent table,
  a ValidTime_TRC between the TRC-attribute in the child table and the ValidTime column in the parent table (parent.TT);
  a check constraint defined on the child table that requires for each row of the child table that the TRC be less than or equal to the TransactionTime;

that the query selects a ValidTime snapshot from the parent table which is equal to or in the future with respect to a system time; and that the query selects a snapshot in TransactionTime from the parent table that is a point-in-time selection or that the query includes a predicate of the form parent.TT CONTAINS child.TRC-attribute.

Clause 18. The non-transitory computer-readable tangible medium of either of clauses 10 or 17 wherein the parent table is a bi-temporal table having a ValidTime column and a TransactionTime column and wherein:

the TRC comprises:
  a TransactionTime_TRC between the TRC-attribute in the child table (child.TRC-attribute) and the TransactionTime column in the parent table,
  a ValidTime_TRC between the TRC-attribute in the child table and the ValidTime column in the parent table (parent.TT);
  a check constraint is defined on the child table that requires for each row of the child table that the TRC be less than or equal to the TransactionTime;
  that the query selects a ValidTime snapshot from the parent table which is in the past with respect to system time;
  that the query selects a TransactionTime snapshot from the child table at a time less than or equal to the ValidTime snapshot from the parent table; and
  that the query selects a snapshot in TransactionTime from the parent table that is a point-in-time selection or that the query includes a predicate of the form parent.TT CONTAINS child.TRC-attribute.

Clause 19. A method comprising:
a database receiving a query that references a child table and a parent table;
the database system determining that referential integrity ("RI") exists between a primary key attribute (pk) in the parent table and a foreign key attribute (fk) in the child table, where "attribute" is defined to mean one or more columns;
the database system assuming, without requiring, that a temporal referential constraint (TRC) exists between a period attribute in the parent table and a TRC-attribute in the child table, the TRC-attribute being a date or time attribute, including that:
  the period attribute in the parent table includes a TransactionTime column having TransactionTime values;
  the child table does not include a ValidTime column;
  the value of the TRC-attribute for a given row identifies a time at which the given row became valid, and wherein the given row is valid from the time specified in the TRC-attribute onward; and
  the value in the TRC-attribute for the given row exists within the value of the period attribute of a parent table row matched to the given row;
the database system determining that the query satisfies non-temporal join elimination conditions;
the database system determining that the query satisfies temporal join elimination conditions;
the database system determining that the query contains no other qualification conditions on the parent table's period attribute;
the database system eliminating the inner join when planning execution of the query;
the database system executing the query against the child table without reference to the parent table to produce a result; and
the database system saving the result.

Clause 20. The method of clause 19 wherein the database system requires the TRC to exist between the period attribute in the parent table and the TRC-attribute in the child table.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
a database system receiving a query;
the database system determining that the query includes an inner join between a parent table and a child table;
the database system determining that the following relationships exist between the parent table and the child table:
  referential integrity ("RI") between a primary key attribute (pk) in the parent table and a foreign key attribute (fk) in the child table, where "attribute" is defined to mean one or more columns; and
  a temporal relationship constraint ("TRC") between a period attribute in the parent table and a TRC-attribute in the child table, the TRC-attribute being a date or time attribute, wherein the TRC requires that:
    the period attribute in the parent table includes a TransactionTime column having TransactionTime values,
    the child table is either a non-temporal table or a TransactionTime table,
    the value of the TRC-attribute for a given row identifies a time at which the given row became valid, and wherein the given row is valid from the time specified in the TRC-attribute onward to the end of time, and
    the value in the TRC-attribute for the given row exists within the value of the period attribute of a parent table row matched to the given row;
determining that the query satisfies non-temporal join elimination conditions;
determining that the query satisfies temporal join elimination conditions;
determining that the query contains no other qualification conditions on the parent table's period attribute;
eliminating the inner join when planning execution of the query;

executing the query against the child table without reference to the parent table to produce a result; and
saving the result.

2. The method of claim 1 wherein determining that the query satisfies temporal join elimination conditions includes:
determining that the query selects a snapshot from the parent table which is equal to or in the future with respect to a system time.

3. The method of claim 1 wherein determining that the query satisfies temporal join elimination conditions includes:
determining that the query selects a snapshot from the parent table which is in the past with respect to system time; and
determining that the query selects a snapshot from the child table which is equal to or prior to the snapshot selected from the parent table.

4. The method of claim 1 wherein determining that the query satisfies temporal join elimination conditions includes:
determining that the query selects a snapshot from the parent table which is in the past with respect to system time; and
determining that the query selects only rows from the child table for which the TRC-attribute is contained in the period attribute of the parent table.

5. The method of claim 4 wherein determining that the query selects only rows from the child table for which the TRC-attribute is contained in the period attribute of the parent table includes:
determining that the query includes a predicate requiring the TRC-attribute to be less than or equal to the time of the snapshot from the parent table.

6. The method of claim 1 wherein determining that the query satisfies temporal join elimination conditions includes:
determining that the query selects only rows from the parent table for which the TRC-attribute is contained in the period attribute of the parent table.

7. The method of claim 6 wherein determining that the query selects only rows from the parent table for which the TRC-attribute is contained in the period attribute of the parent table includes determining that the query contains a WHERE clause of the form parent.TransactionTime CONTAINS child.TRCcolumn, where parent.TransactionTime is the period attribute in the parent table and child.TRCcolumn is the TRC-attribute in the child table.

8. The method of claim 1 wherein the parent table is a bi-temporal table having a ValidTime column and a TransactionTime column and wherein:
the TRC comprises:
a TransactionTime_TRC between the TRC-attribute in the child table (child.TRC-attribute) and the TransactionTime column in the parent table (parent.TT);
a ValidTime_TRC between the TRC-attribute in the child table and the ValidTime column in the parent table;
a check constraint is defined on the child table that requires for each row of the child table that the TRC be less than or equal to the TransactionTime;
that the query selects a ValidTime snapshot from the parent table which is equal to or in the future with respect to a system time; and
that the query selects a snapshot in TransactionTime from the parent table that is a point-in-time selection or that the query includes a predicate of the form parent.TT CONTAINS child.TRC-attribute.

9. The method of claim 1 wherein the parent table is a bi-temporal table having a ValidTime column and a TransactionTime column and wherein:
the TRC comprises:
a TransactionTime_TRC between the TRC-attribute in the child table (child.TRC-attribute) and the TransactionTime column in the parent table (parent.TT);
a ValidTime_TRC between the TRC-attribute in the child table and the ValidTime column in the parent table;
a check constraint is defined on the child table that requires for each row of the child table that the TRC be less than or equal to the TransactionTime;
that the query selects a ValidTime snapshot from the parent table which is in the past with respect to system time; and
that the query selects a TransactionTime snapshot from the child table at a time less than or equal to the ValidTime snapshot from the parent table;
that the query selects a snapshot in TransactionTime from the parent table that is a point-in-time selection or that the query includes a predicate of the form parent.TT CONTAINS child.TRC-attribute.

10. A non-transitory computer-readable tangible medium, on which is recorded a computer program, the computer program comprising executable instructions, that, when executed, perform a method comprising:
a database system determining that the query includes an inner join between a parent table and a child table;
the database system determining that the following relationships exist between the parent table and the child table:
referential integrity ("RI") between a primary key attribute (pk) in the parent table and a foreign key attribute (fk) in the child table, where "attribute" is defined to mean one or more columns; and
a temporal relationship constraint ("TRC") between a period attribute in the parent table and a TRC-attribute in the child table, the TRC-attribute being a date or time attribute, wherein the TRC requires that:
the period attribute in the parent table includes a TransactionTime column having TransactionTime values,
the child table is either a non-temporal table or a TransactionTime table,
the value of the TRC-attribute for a given row identifies a time at which the given row became valid, and wherein the given row is valid from the time specified in the TRC-attribute onward to the end of time, and
the value in the TRC-attribute for the given row exists within the value of the period attribute of a parent table row matched to the given row;
determining that the query satisfies non-temporal join elimination conditions;
determining that the query satisfies temporal join elimination conditions;
determining that the query contains no other qualification conditions on the parent table's period attribute;
eliminating the inner join when planning execution of the query;
executing the query against the child table without reference to the parent table to produce a result; and
saving the result.

11. The non-transitory computer-readable tangible medium of claim 10 wherein determining that the query satisfies temporal join elimination conditions includes:
 determining that the query selects a snapshot from the parent table which is equal to or in the future with respect to a system time.

12. The non-transitory computer-readable tangible medium of claim 10 wherein determining that the query satisfies temporal join elimination conditions includes:
 determining that the query selects a snapshot from the parent table which is in the past with respect to system time; and
 determining that the query selects a snapshot from the child table which is equal to or prior to the snapshot selected from the parent table.

13. The non-transitory computer-readable tangible medium of claim 10 wherein determining that the query satisfies temporal join elimination conditions includes:
 determining that the query selects a snapshot from the parent table which is in the past with respect to system time; and
 determining that the query selects only rows from the child table for which the TRC-attribute is contained in the period attribute of the parent table.

14. The non-transitory computer-readable tangible medium of claim 13 wherein determining that the query selects only rows from the child table for which the TRC-attribute is contained in the period attribute of the parent table includes:
 determining that the query includes a predicate requiring the TRC-attribute to be less than or equal to the time of the snapshot from the parent table.

15. The non-transitory computer-readable tangible medium of claim 10 wherein determining that the query satisfies temporal join elimination conditions includes:
 determining that the query selects only rows from the parent table for which the TRC-attribute is contained in the period attribute of the parent table.

16. The non-transitory computer-readable tangible medium of claim 15 wherein determining that the query selects only rows from the parent table for which the TRC-attribute is contained in the period attribute of the parent table includes determining that the query contains a WHERE clause of the form parent.TransactionTime CONTAINS child.TRCcolumn, where parent.TransactionTime is the period attribute in the parent table and child.TRCcolumn is the TRC-attribute in the child table.

17. The non-transitory computer-readable tangible medium of claim 10 wherein the parent table is a bi-temporal table having a ValidTime column and a TransactionTime column and wherein:
 the TRC comprises:
  a TransactionTime_TRC between the TRC-attribute in the child table (child.TRC-attribute) and the TransactionTime column in the parent table (parent.TT);
  a ValidTime_TRC between the TRC-attribute in the child table and the ValidTime column in the parent table (parent.TT);
  a check constraint is defined on the child table that requires for each row of the child table that the TRC be less than or equal to the TransactionTime;
 that the query selects a ValidTime snapshot from the parent table which is equal to or in the future with respect to a system time; and
 that the query selects a snapshot in TransactionTime from the parent table that is a point-in-time selection or that the query includes a predicate of the form parent.TT CONTAINS child.TRC-attribute.

18. The non-transitory computer-readable tangible medium of claim 10 wherein the parent table is a bi-temporal table having a ValidTime column and a TransactionTime column and wherein:
 the TRC comprises:
  a TransactionTime_TRC between the TRC-attribute in the child table (child.TRC-attribute) and the TransactionTime column in the parent table,
  a ValidTime_TRC between the TRC-attribute in the child table and the ValidTime column in the parent table (parent.TT);
  a check constraint defined on the child table that requires for each row of the child table that the TRC be less than or equal to the TransactionTime;
 that the query selects a ValidTime snapshot from the parent table which is in the past with respect to system time;
 that the query selects a TransactionTime snapshot from the child table at a time less than or equal to the ValidTime snapshot from the parent table; and
 that the query selects a snapshot in TransactionTime from the parent table that is a point-in-time selection or that the query includes a predicate of the form parent.TT CONTAINS child.TRC-attribute.

19. A method comprising:
 a database receiving a query that references a child table and a parent table;
 the database system determining that referential integrity ("RI") exists between a primary key attribute (pk) in the parent table and a foreign key attribute (fk) in the child table, where "attribute" is defined to mean one or more columns;
 the database system assuming, without requiring, that a temporal referential constraint (TRC) exists between a period attribute in the parent table and a TRC-attribute in the child table, the TRC-attribute being a date or time attribute, including that:
  the period attribute in the parent table includes a TransactionTime column having TransactionTime values;
  the child table is either a non-temporal table or a TransactionTime table does;
  the value of the TRC-attribute for a given row identifies a time at which the given row became valid, and wherein the given row is valid from the time specified in the TRC-attribute onward to the end of time; and
  the value in the TRC-attribute for the given row exists within the value of the period attribute of a parent table row matched to the given row;
 the database system determining that the query satisfies non-temporal join elimination conditions;
 the database system determining that the query satisfies temporal join elimination conditions;
 the database system determining that the query contains no other qualification conditions on the parent table's period attribute;
 the database system eliminating the inner join when planning execution of the query;
 the database system executing the query against the child table without reference to the parent table to produce a result; and
 the database system saving the result.

20. The method of claim 19 wherein the database system requires the TRC to exist between the period attribute in the parent table and the TRC-attribute in the child table.

* * * * *